No. 733,918. Patented July 14, 1903.

UNITED STATES PATENT OFFICE.

ALIDA LOUISE ROSENTHAL, OF LONDON, ENGLAND, ADMINISTRATRIX OF SIGMUND ADOLF ROSENTHAL, DECEASED.

ACTIVE MATERIAL FOR ELECTRIC ACCUMULATORS.

SPECIFICATION forming part of Letters Patent No. 733,918, dated July 14, 1903.

Application filed May 8, 1903. Serial No. 156,219. (No specimens.)

*To all whom it may concern:*

Be it known that SIGMUND ADOLF ROSENTHAL, deceased, late a subject of the Emperor of Germany, and a resident of Waltham Cross, in the county of Essex, England, did invent certain new and useful Improvements Relating to the Manufacture of Active Material for the Plates of Electric Accumulators, of which the following is a specification.

This invention relates to the manufacture of active material for the plates of electric accumulators, and has for its object to obtain a maximum storage capacity and durability with a minimum weight, so that the plates and batteries in which the active material is employed are particularly rendered portable and especially suited for electric miners' lamps and for traction purposes.

The invention consists in the employment of urea sulfate $(CO(NH_2)2)2H_2SO_4$ as a binding agent for the active material of electric accumulator-plates where the oxids of lead, finely powdered—such as, for example, litharge, minium, or red lead, but preferably litharge—are used.

The invention also consists in the process of manufacturing which is hereinafter described and also in the employment in combination with urea sulfate of a small quantity of lead sulfate.

Experiments and lengthy observations have shown that in employing a solution in water of urea sulfate of suitable strength and mixing this solution with the lead oxid, finely powdered, an extraordinary hardening effect is produced upon the composition. In order to prevent a too-rapid hardening of the material and to allow it to be properly brought or molded into the desired shape or to form a plate, the urea-sulfate solution is first mixed with diluted sulfuric acid, preferably of a specific gravity of 1.200, and this mixed solution is then used for mixing with the lead oxid, which mixture is effected until a stiff paste is obtained, which may be made into plates by compressing or molding it into any required form or shape. After the paste plate is set a lead frame may be cast around it to form the complete electrode, or while the material is still in the form of stiff paste it may be filled on or into any lead-grid conductor and then dried. The following parts, by weight, have yielded a suitable mixture: one and a half to two parts of urea sulfate and four to six parts of water. The addition to the urea sulfate of five per cent. of lead sulfate is highly advantageous. Of this solution one part, by volume, is mixed with one and a half to two parts, by volume, of a solution of sulfuric acid of 1.200 specific gravity. Upon the pasted plates being formed by the usual electrolytic action the paste becomes very coherent and has a hard and toughened texture and surface, and from this property a battery formed with these plates has been found to be specially adapted for use for electric traction, electric cars, and such purposes where a high-discharge output and durability are required.

What is claimed as the invention, and desired to be secured by Letters Patent, is—

1. A process of making active material for accumulator-plates which consists in adding urea sulfate to an oxid of lead.

2. A process of making active material for accumulator-plates which consists in adding urea sulfate and a relatively small quantity of lead sulfate to an oxid of lead.

3. The manufacture of active material for the plates of electric accumulators by the admixture of a solution in water of urea sulfate with an oxid of lead, for the purpose and substantially as described.

4. The manufacture of active material for the plates of electric accumulators by the admixture of a solution of urea sulfate and sulfuric acid with an oxid of lead, for the purposes and substantially as described.

5. Material for the plates of electric accumulators, in which urea sulfate is admixed with an oxid of lead, for the purposes and substantially as described.

In testimony whereof I have signed my name to this specification in the presence of two subscribing witnesses.

ALIDA LOUISE ROSENTHAL,
*Administratrix of the estate of Sigmund Adolf Rosenthal, deceased.*

Witnesses:
FREDOLIN FREI,
WALTER J. SKERTEN.